US008074035B1

(12) United States Patent
Per et al.

(10) Patent No.: US 8,074,035 B1
(45) Date of Patent: Dec. 6, 2011

(54) SYSTEM AND METHOD FOR USING MULTIVOLUME SNAPSHOTS FOR ONLINE DATA BACKUP

(75) Inventors: Yuri S. Per, Moscow (RU); Juri V. Tsibrovski, Moscow (RU); Maxim V. Lyadvinsky, Moscow (RU); Serguei M. Beloussov, Singapore (SG)

(73) Assignee: Acronis, Inc., Tortola (VG)

( * ) Notice: Subject to any disclaimer, the term of this patent is extended or adjusted under 35 U.S.C. 154(b) by 358 days.

(21) Appl. No.: 11/960,488

(22) Filed: Dec. 19, 2007

Related U.S. Application Data

(63) Continuation-in-part of application No. 11/382,851, filed on May 11, 2006, now Pat. No. 7,318,135, which is a continuation of application No. 10/925,928, filed on Aug. 26, 2004, now Pat. No. 7,047,380, which is a continuation-in-part of application No. 10/624,858, filed on Jul. 22, 2003, now Pat. No. 7,246,211.

(51) Int. Cl.
*G06F 12/00* (2006.01)

(52) U.S. Cl. ........ 711/162; 711/154; 711/161; 707/610; 707/639; 707/640

(58) Field of Classification Search .................. None
See application file for complete search history.

(56) References Cited

U.S. PATENT DOCUMENTS

| | | | |
|---|---|---|---|
| 5,410,667 A | 4/1995 | Belsan et al. | |
| 5,720,026 A | 2/1998 | Uemura et al. | |
| 5,819,292 A | 10/1998 | Hitz et al. | |
| 5,832,515 A | 11/1998 | Ledain et al. | |
| 5,905,990 A | 5/1999 | Inglett | |
| 5,996,054 A | 11/1999 | Ledain et al. | |
| 6,021,408 A | 2/2000 | Ledain et al. | |
| 6,038,639 A | 3/2000 | O'Brien et al. | |
| 6,061,770 A | 5/2000 | Franklin | |
| 6,081,875 A * | 6/2000 | Clifton et al. | 711/162 |
| 6,101,585 A | 8/2000 | Brown et al. | |
| 6,173,377 B1 | 1/2001 | Yanai et al. | |
| 6,205,450 B1 | 3/2001 | Kanome | |
| 6,289,356 B1 | 9/2001 | Hitz et al. | |
| 6,341,341 B1 | 1/2002 | Grummon et al. | |
| 6,618,736 B1 | 9/2003 | Menage | |
| 2001/0049776 A1 * | 12/2001 | Maeda | 711/162 |
| 2003/0005235 A1 * | 1/2003 | Young | 711/141 |
| 2003/0115433 A1 * | 6/2003 | Kodama | 711/162 |
| 2007/0050545 A1 * | 3/2007 | Tsuboki et al. | 711/114 |

* cited by examiner

*Primary Examiner* — Arpan P. Savla
(74) *Attorney, Agent, or Firm* — Bardmesser Law Group

(57) ABSTRACT

A system and method for multivolume file system backup without suspending activity of user application programs uses a file system snapshot of two and more partitions or volumes of the storage device, or two and more data storages, significantly increasing computer system availability and allows backing up two and more partitions of the storage device without interrupting computer services. Backup procedure is performed online, simultaneously creates snapshots of two and more partitions of the storage device or storage devices in the pre-selected point of time and copies data blocks from partitions into the backup storage device, optionally through the intermediate storage device. When a write command is directed to a data storage block identified for backup that has not yet been backed up, the identified data storage block is copied from the storage device to the intermediate storage device, the write command is executed on the identified data storage block from the storage device, and the data storage block is copied from the intermediate storage device to the backup storage device.

16 Claims, 14 Drawing Sheets

SYSTEM AND METHOD FOR USING MULTIVOLUME SNAPSHOTS FOR ONLINE DATA BACKUP

CROSS REFERENCE TO RELATED APPLICATIONS

This application is continuation in part of U.S. patent application Ser. No. 11/382,851, filed May 11, 2006, entitled SYSTEM AND METHOD FOR USING FILE SYSTEM SNAPSHOTS FOR ONLINE DATA BACKUP, which is a continuation of U.S. patent application Ser. No. 10/925,928, filed Aug. 26, 2004, entitled SYSTEM AND METHOD FOR USING FILE SYSTEM SNAPSHOTS FOR ONLINE DATA BACKUP, and which is a continuation-in-part of U.S. patent application Ser. No. 10/624,858, filed Jul. 22, 2003, entitled SYSTEM AND METHOD FOR USING FILE SYSTEM SNAPSHOTS FOR ONLINE DATA BACKUP, which are incorporated herein by reference in their entirety.

BACKGROUND OF THE INVENTION

1. Field of the Invention

The present invention relates to computer systems and, more specifically, to a system and method for providing multi-volume online data backup.

2. Background Art

Typically, an operating system of a computer system includes a file system to provide users with an interface while working with data on the computer system's disk and to provide the shared use of files by several users and processes. Generally, the term "file system" encompasses the totality of all files on the disk and the sets of data structures used to manage files, such as, for example, file directories, file descriptors, free and used disk space allocation tables, and the like. File systems may also enhance system performance with additional functions such as, for example, caching, access markers and fault-tolerance.

Generally, a file system architecture that provides a recoverable file system is preferable to conventional file systems that lack this feature. In conventional systems, "careful" write and "lazy" write are the two main approaches to implementing input-output support and caching in file systems. Typically, a careful write is implemented in file systems developed for VAX/VMS and other similar closed operating systems. A lazy write is generally implemented in the HPFS (High Performance File System) of the OS/2 operating system and in most UNIX file systems.

In the event of an operating system failure or power supply interruption, for example, input-output operations performed at that time are immediately interrupted. Depending on what operations were performed and how far the execution of these operations had advanced, such interruption may affect the integrity of the file system.

When a file system of any type receives a request for renewal of disk content, the file system must perform several sub-operations before the renewal can be completed. In file systems using the strategy of careful write, these sub-operations always write their data onto the disk.

A file system utilizing the careful write policy generally sacrifices its performance for reliability. On the other hand, a file system with lazy write typically increases performance due to the strategy of write-back caching. Writeback caching is a caching method in which modifications to data in the cache aren't copied to the cache source until absolutely necessary. This method of caching using the lazy write policy provides several advantages over the careful write policy, which accordingly increases system performance.

Recoverable file systems, such as, for example, Microsoft NTFS (Windows NT File System), may provide greater reliability than file systems with careful write, but also provide the performance of file systems with lazy write.

The high reliability of the recoverable file system has its disadvantages. For each transaction that modifies the volume structure, the file system must enter one record into the journal file for each transaction sub-operation. The integration of journal file records into packets may increase the efficiency of the file system: for each input-output operation, several records may be simultaneously added to the journal. Moreover, the recoverable file system may use optimization algorithms, such as those used by file systems utilizing lazy write. The file system may also increase the intervals between writing the cache contents to the disk, because the file system can be recovered if a failure occurs before the modifications are copied from cache to the disk. The utilization of these tactics to improve performance generally compensates for and may even exceed the performance losses incurred by protocolling the transactions.

But, neither careful write nor lazy write can guarantee protection of user data. If a system failure occurs at the moment an application writes to a file, then the file may be lost or destroyed. Moreover, in the case of a lazy write policy, the failure may damage the file system because the lazy write policy may have destroyed existing files or even made all information on the volume unavailable.

In contrast, recoverable file systems, such as, for example, Windows NTFS, possesses greater reliability in comparison with traditional file systems.

The development of file systems demonstrates that fault-tolerance and recoverability of file systems after failures are important design considerations. To provide maximum reliability, it is necessary to periodically copy all files as an immediate copy or cast of the file system, e.g., a snapshot. By its functionality, a snapshot is very similar to the journal of a recoverable file system, as they can both restore the system to the integral state. A snapshot guarantees full data recovery, but incurs high expenses in creation and storage.

Snapshot creation generally involves sector by sector copying of the whole file system, i.e., service information and data. If the file system is currently active, then files may be modified during copying—some files can be open for writing or locked, for example. In the simplest case, the file system can be suspended for some time and during that time a snapshot is recorded. Of course, such an approach cannot be applied to servers where uninterruptible activity of the file system is necessary.

In most cases the archiving of one disk or one partition is insufficient. Data for one program (for example, Microsoft SQL Server) can be located on several hard disk drives (HDD) or on several partitions of one or more hard disk drives. In this case, it is necessary to stop the SQL Server, so that data of SQL Server will not change on one of these partitions during backup. If SQL Server's writes are not be stopped or suspended then data on one backed-up partition will not correspond to data on the other partitions. Data on a second partition can changes during the backup process of a first partition, and backed-up data from both partitions will not be synchronized.

One of solutions to this problem is stopping/suspending SQL Server service, which controls write operations to the partitions, to create a backup of the volumes. But, in this case, the SQL Server will not save the information on the volumes until the end of the backup process (i.e., the SQL Server is off-line during the backup process). In most cases, a lot of time, sometimes tens of minutes is needed for the backup process.

For example, one common problem in the context of backing up large amounts of data relates to database backups, particularly where the databases are large and distributed across several physical drives, or several partitions, or several volumes. Thus, the conventional approach would be to freeze the entire database (or at least block attempts to write to the database, but possibly allowing reads to the database), and use the now frozen database for backups. This is done because if a backup is done of one of the volumes, while the user application that utilizes the database is writing to a different volume, portions of the backup will be out of sync with the original copy of the database. Therefore, since such a situation is not acceptable, the entire database is often frozen, and then backed-up. The problem is that during that time, the database is not available, and for large enough databases, the time involved can be considerable.

Accordingly, due to the disadvantages associated with conventional data backup systems, there is a need for a multi-volume data backup process that is both reliable and efficient not just for one partition of the data storage device, but for two and more partitions of one and more data storage device. Moreover, there is a need for an online data backup process that allows a computer system to remain online while data on multiple volumes is being backed-up and also addresses the disadvantages associated with conventional back-up systems.

SUMMARY OF THE INVENTION

Accordingly, the present invention relates to computer systems and, more specifically, to a system and method for multivolume file system backup without suspending activity of user application programs uses a file system snapshot of two and more partitions or volumes of the storage device, or two and more data storages, significantly increasing computer system availability and allows backing up two and more partitions of the storage device without interrupting computer services. Backup procedure is performed online, simultaneously creates snapshots of two and more partitions of the storage device or storage devices in the pre-selected point of time and copies data blocks from partitions into the backup storage device, optionally through the intermediate storage device. When a write command is directed to a data storage block identified for backup that has not yet been backed up, the identified data storage block is copied from the storage device to the intermediate storage device, the write command is executed on the identified data storage block from the storage device, and the data storage block is copied from the intermediate storage device to the backup storage device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS OF THE INVENTION

Figure 1:
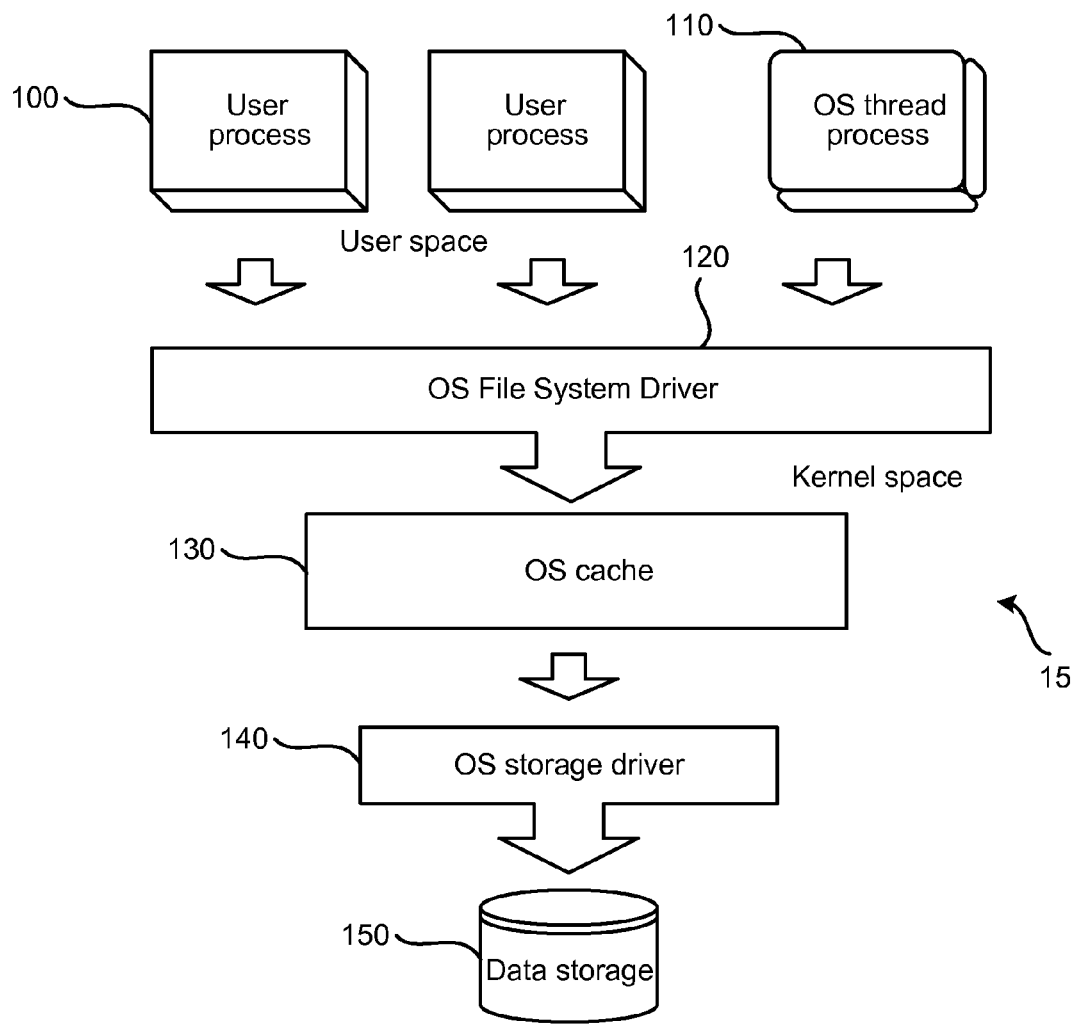
FIG. 1 shows an exemplary embodiment of the computer system of the present invention.

The present invention provides a system and method for file system backup without suspending online application programs using file system snapshots of two and more partitions of the storage device. Accordingly, the present system and method significantly increase computer system availability and allows backing up two and more partitions and/or volumes of the storage device without interrupting computer services.

The computer file system is usually located on the block data storage and typically interacts with storage at the level of blocks. For example, read and write operations are performed in connection with data areas that have sizes that are divisible by the size of one block. The sequence of the blocks in the storage is ordered and each block has its own number.

Also, a data storage device can be divided into two or more partitions, or volumes. Partitioning makes it possible to create several file systems (either of the same type or different types) on a single data storage device. Partitioning also makes it possible to use multi-booting setups, which allow users have more than one operating system on a single computer, raising overall computer performance.

Hard drives with one partition typically have a very large a file table, and it generally takes more time for an operating system to read and manage this file table than managing a file table of hard drives with multiple partitions (because each partition has fewer files). Higher levels of data organization raise efficient use of the system, for example separate partitions or drives can be dedicated to digital movie processing, photos, email mailboxes or browser cache. Partitions may be customized to different requirements, for example, allowing for read-only partitions to protect data: if one partition is damaged, none of the other file systems are affected, and the drive's data may still be salvageable.

For example, for DOS, Microsoft Windows and Linux, each partition is described by an entry in the partition table which is located in the master boot record.

The "type" of a partition is identified by a code found in its partition table entry.

Some of these codes (such as 0x05 and 0x0F) may be used to indicate the presence of an extended partition, but most are used by operating systems that examine partition tables to decide if a partition contains a file system they can mount/access for reading or writing data.

Once a specific partition's type has been identified, additional information about its purpose and probable contents may be found. Some types of codes are used to hide a partition's contents from operating systems. However, if an operating system has been programmed to also examine the boot sectors of any partition, then its file system can no longer remain hidden.

Thus, as used in this text, a "data storage device" refers to a physical device, such as a hard disk drive. A "data storage" is a logical entity, such as a partition, a volume, a logical drive, and so on. Often, several data storages can exist on the same data storage device. In some cases, a logical entity and a physical device can be the same (for example, in a system where multiple unpartitioned disk drives are used).

The computer system may include several such storages and the file system may take only a portion of one such storage, the entire storage, or several such storages or their parts. On the disk or storage device, these types of storages are usually located in partitions, taking up the entire partition.

The file systems may be subdivided into several categories, including the housekeeping data of the file system volume, file metadata, file data, and free space not occupied by the other data. A file system driver embedded into the operating system may provide the servicing for the file system. FIG. 1 shows an exemplary embodiment of the computer system of the present invention, shown generally at 105. The computer system 105 includes a data storage device 150 that may be accessed by one or more user processes 100 or OS thread processes 110. OS user processes 100 or OS thread processes 110 may request to read or write data to the data storage 150 via a file system request.

This request may be directed to the file system driver 120, which defines where in the data storage the relevant data blocks are located. The request is then directed to the OS cache 130 where the requested data may be currently cached. If the requested data is located in the OS cache 130, the system may complete the requested operation by allowing the user process 100 or OS thread process 110 to read and write of the cached data. If the requested data is not located in the OS cache 130 or is otherwise unavailable (e.g., the space in cache must be freed pursuant to an OS algorithm), the request is transmitted for execution to the OS storage driver 140. The OS storage driver subsequently performs the requested operation on the selected data located in the data storage 150.

The OS storage driver 140 may interact with the storage device 150 in block mode. As discussed above, in the context of data management, a block is a group of records on a storage device. Blocks are typically manipulated as units. For example, a disk drive may read and write data in 512-byte blocks. Accordingly, the OS storage driver 140 may receive requests for data read and write using blocks of the selected block size. Typically, each data block is associated with a number or label corresponding to the type of operation to be performed. Thus, the driver associated with the data write operation acquires a set of numerical pairs (e.g., the data block and number) in order to process the data write command.

Figure 2:
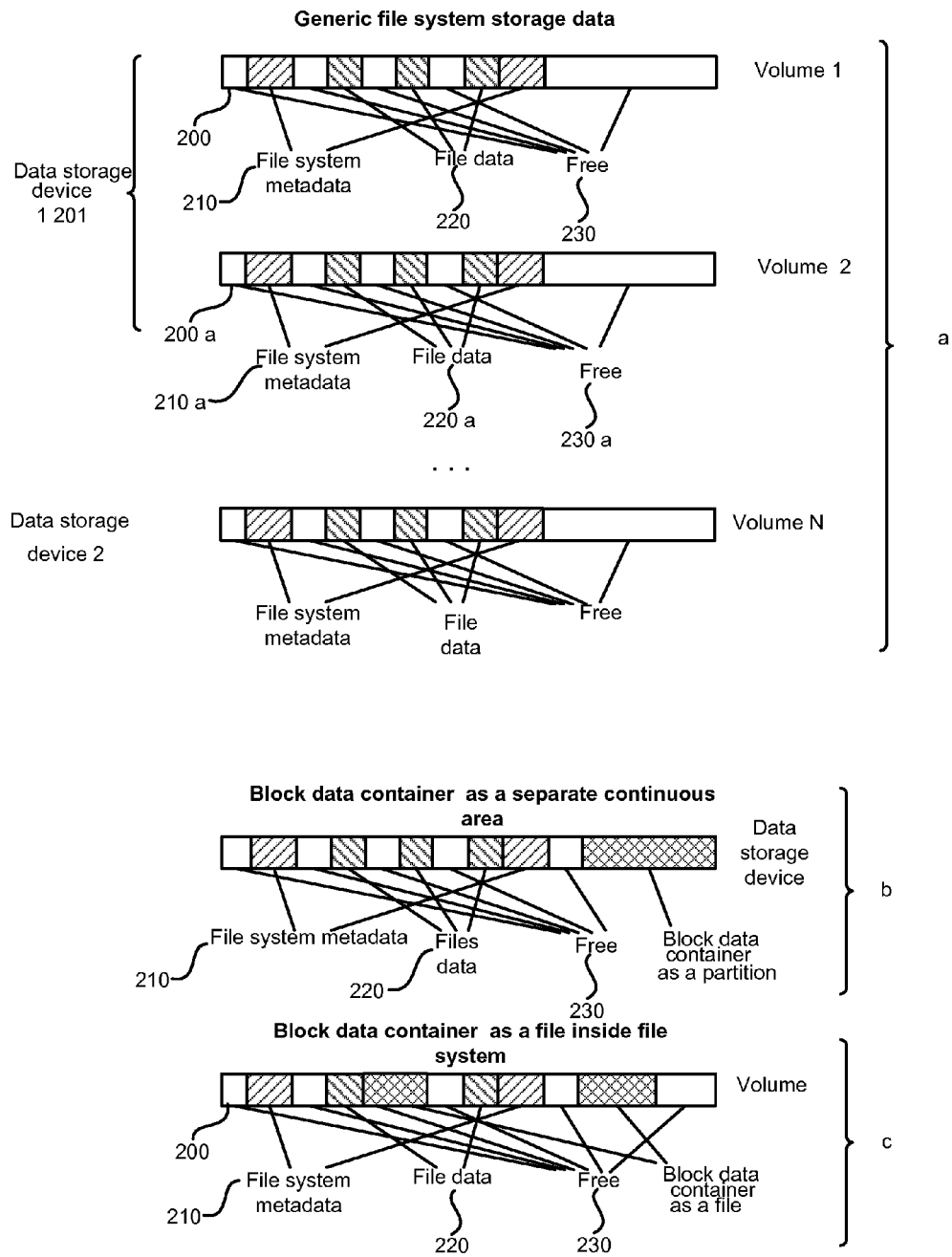
FIGS. 2a, 2b and 2c show exemplary embodiments of the system storage, including exemplary embodiments of the intermediate block data container of the present invention.

FIG. 2 illustrates an exemplary embodiment of the system storage device. Data storage device 201 is a file system storage data device or location. From the point of view of the file system, the blocks of data stored in the block data storage device 201 can be characterized into several different classes. Depending on the file system type, the data storage device 201 can store data specific for the volume 1 200 and volume 2 200a, metadata of the file system 210 and 210a, file data 220 and 220a, or free space 230 and 230a not currently taken by other data. Generally, a specific data type may be allocated to an entire data block and different data types cannot be combined in one block. But under specific circumstances, a file system may combine different data into one block (e.g., ReiserFS or Microsoft Windows NTFS).

The volume can be an entire data storage device (such as an entire hard disk drive in whole) or a partition of the storage device.

Thus, by copying all data blocks that are not free (e.g., all blocks except entirely free blocks 230 and 230a), the system may obtain a file system snapshots that serves as a copy of its state at a current moment of time. Although listing the file system blocks is not a requirement, listing may be used to optimize the space used by the backup procedure. In the event this information cannot be acquired by the system, the block fetching procedure may select all of the blocks associated with storing any file system data, including free blocks.

As discussed above, a data backup operation is time consuming. Thus, in order to conform backed up data with any specific state at a given moment, the data being copied must not change before the backup operation is completed.

Figure 3A:
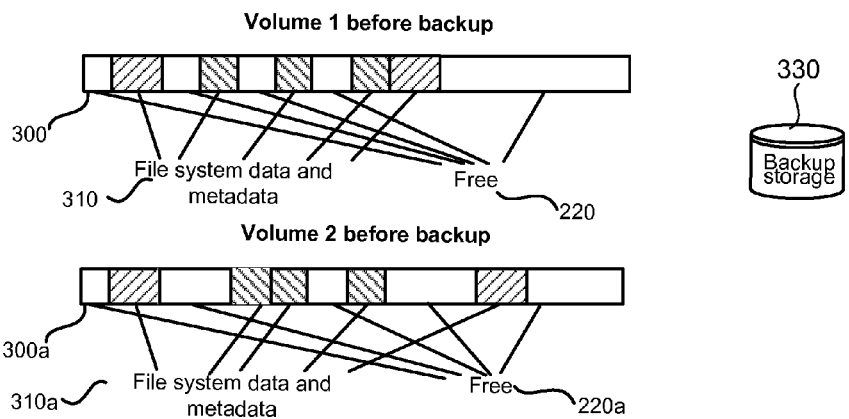
FIGS. 3a, 3b and 3c show the process of data backup.
Figure 3B:
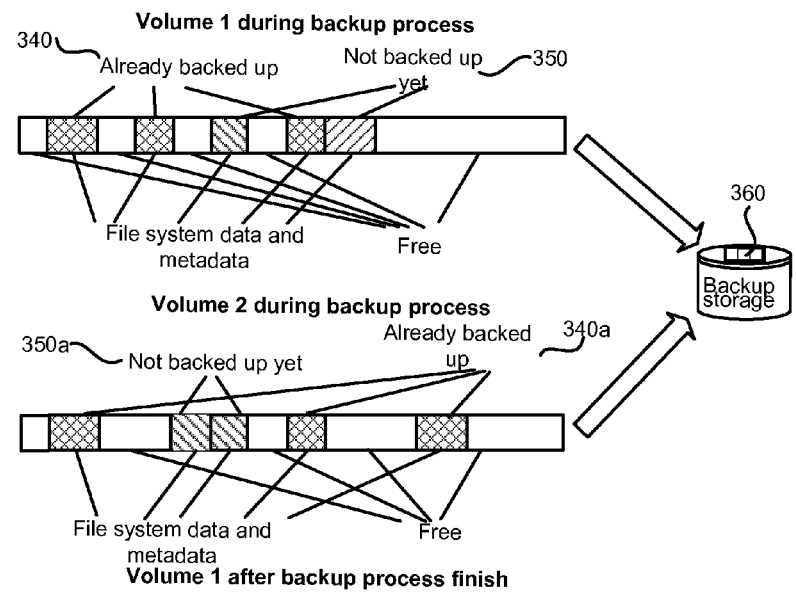
Figure 3C:
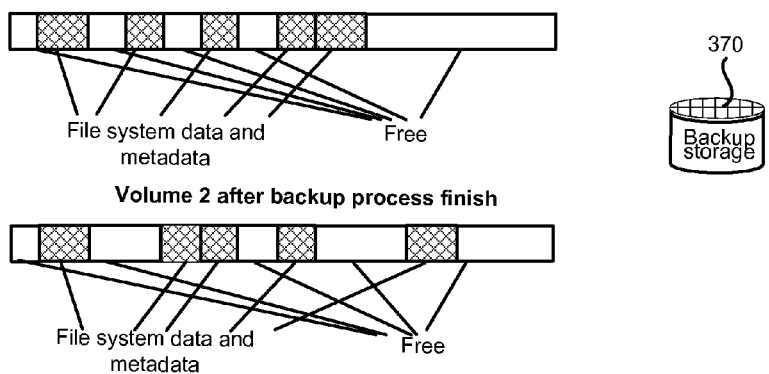

Typically, this task is not difficult if the data storage and the file system associated with the storage are not connected to any active computer or is otherwise blocked from data modification. Basically, the risk of nonconforming data is reduced if there are no processes able to modify data. FIG. 3 illustrates a conventional consecutive write process of the file system data during a typical (e.g., not online) data backup procedure. In order to carry out the data backup, the volume 1 300 and volume 2 300a must be re-written to the backup storage 330. Note, volumes can be part of one storage device or different storage devices. FIG. 3a shows the status of the volumes data before the backup process has been initiated. In order to optimize the backup process by increasing performance and reducing space requirements, the system will only copy the occupied areas 310, 310a and not the free blocks 320, 320a. During this process, as shown in FIG. 3b, the file system data subject to backup may be in the two different states: (1) data that is already backed up 340, 340a to the backup storage and (2) data that is not yet backed up, but only scheduled for backup 350, 350a. When backup is completed, as shown in FIG. 3c, all of the data is now located in the backup storage 370, and the file system and main data storage are subsequently ready for user operations and access.

If the file system is connected to an active computer and there are file system processes and user applications working with data during the backup process (e.g., online backup), then the task becomes more complicated. On-line backup is typical for servers with a high level of accessibility and therefore cannot be stopped to allow backup to be completed.

Figure 4:
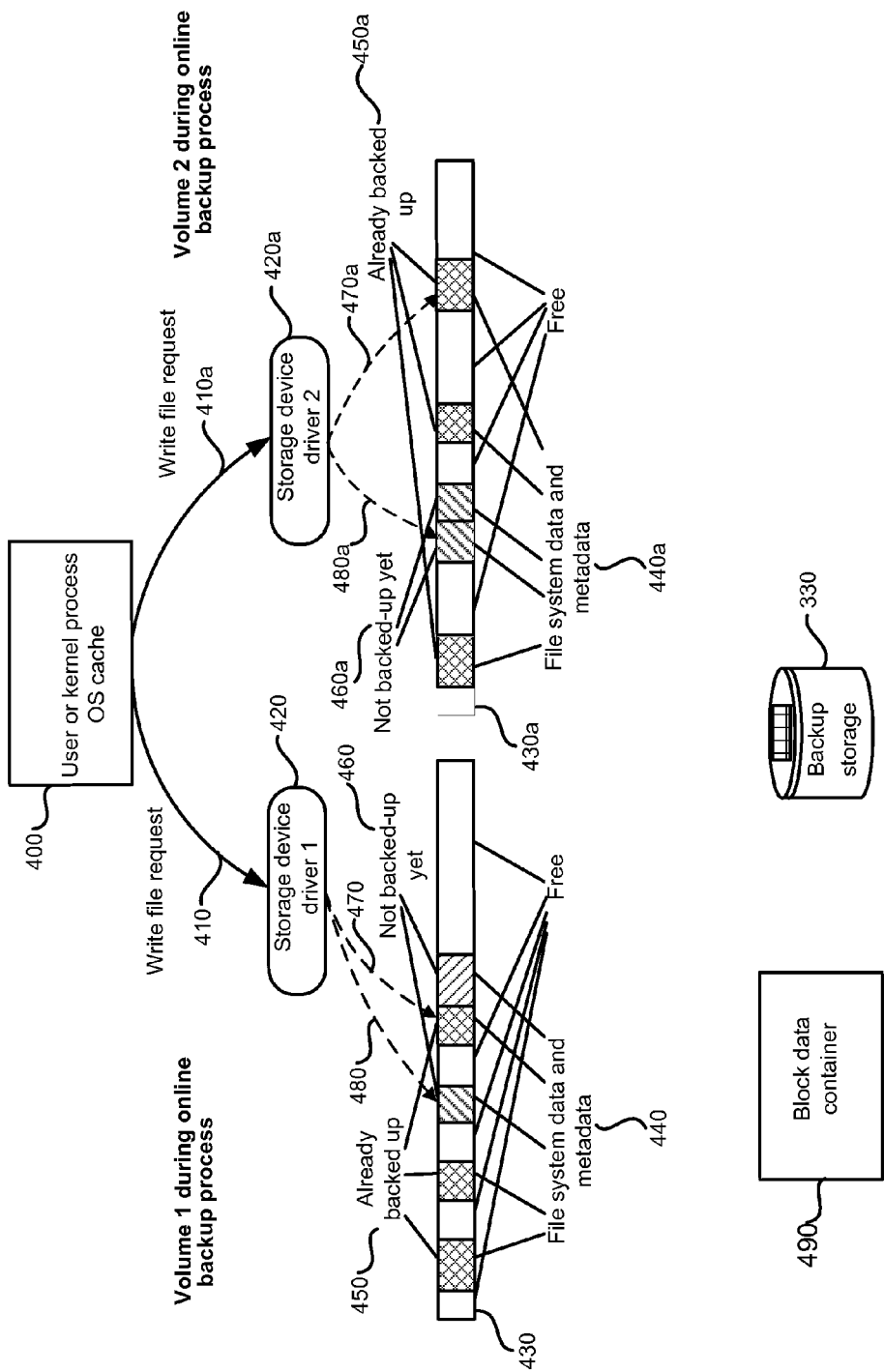
FIG. 4 shows an exemplary embodiment of the data backup process of the present invention.

FIG. 4 illustrates an exemplary embodiment of the online backup process that addresses the shortcomings of offline data backup. For the purposes of illustration, the following example assumes that the backup process for the data of volume 1 (430) of data storage 1 (for the purposes of illustration, the data storage is a data storage device as a non-volatile storage device, for example, a hard disk drive) and volume 2 (430a) of data storage 2 is launched such that the backup process may be performed within the off-line backup procedure. In this embodiment of invention two volumes (partitions), which are part of two storage devices, are considered.

Note that more than two volumes/data storage devices can be backed up. In one embodiment of the present invention, backups of the different volumes are done in one point in time, which avoids the problem of one of the volumes becoming out of sync with the rest of the backup. By using the intermediate storage described above, the writes are done to the intermediate storage, while a snapshot is created of the actual volumes being backed up. Once the snapshots are created, the contents of the temporary storage can then be used to update the snapshots. The intermediate storage can be written to incrementally, and the backed-up volumes can then be updated, either incrementally, or all at once.

Figure 13:
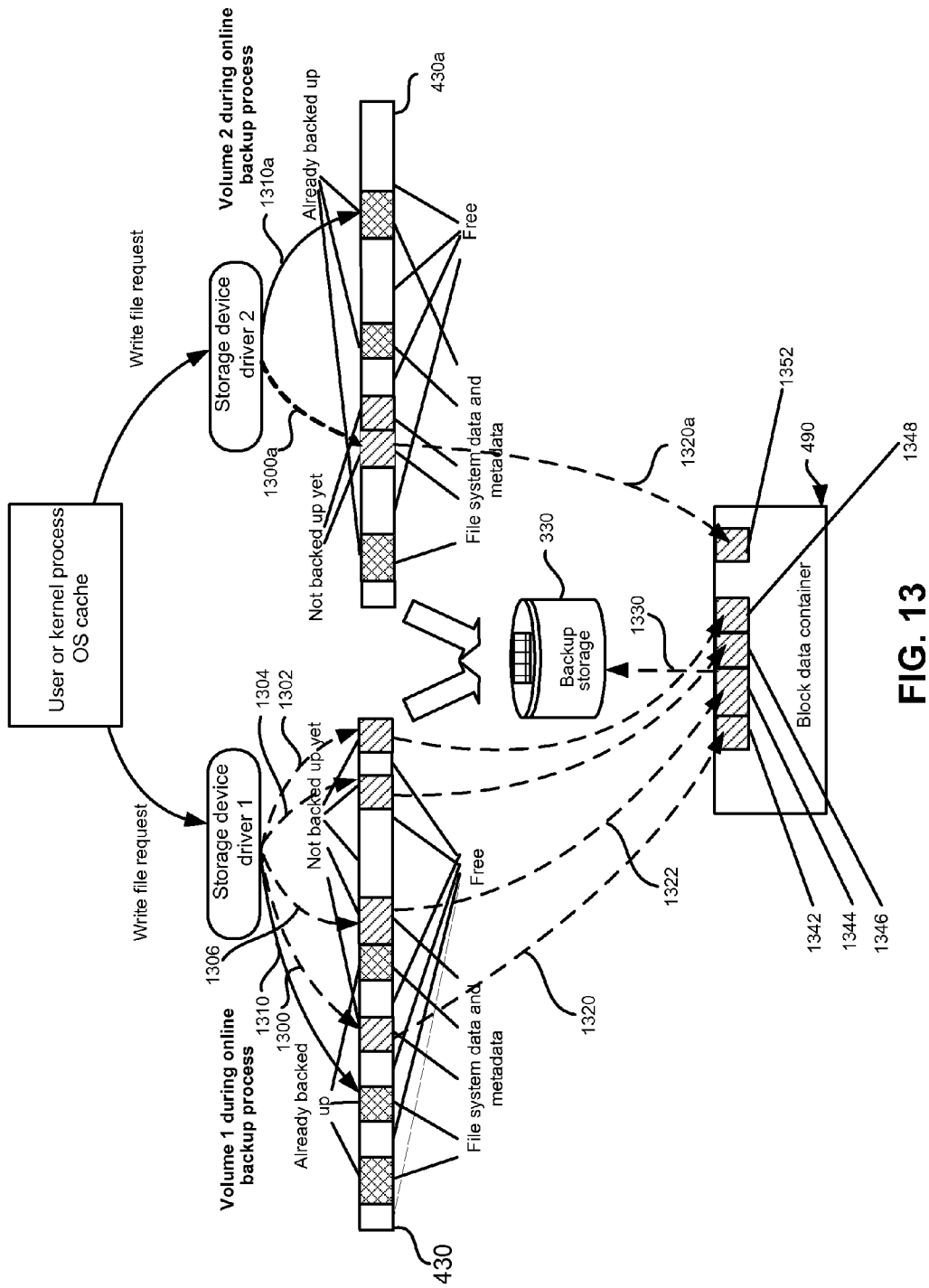
FIG. 13 illustrates an exemplary embodiment of the present invention for handling a backup prioritization.
Figure 14:
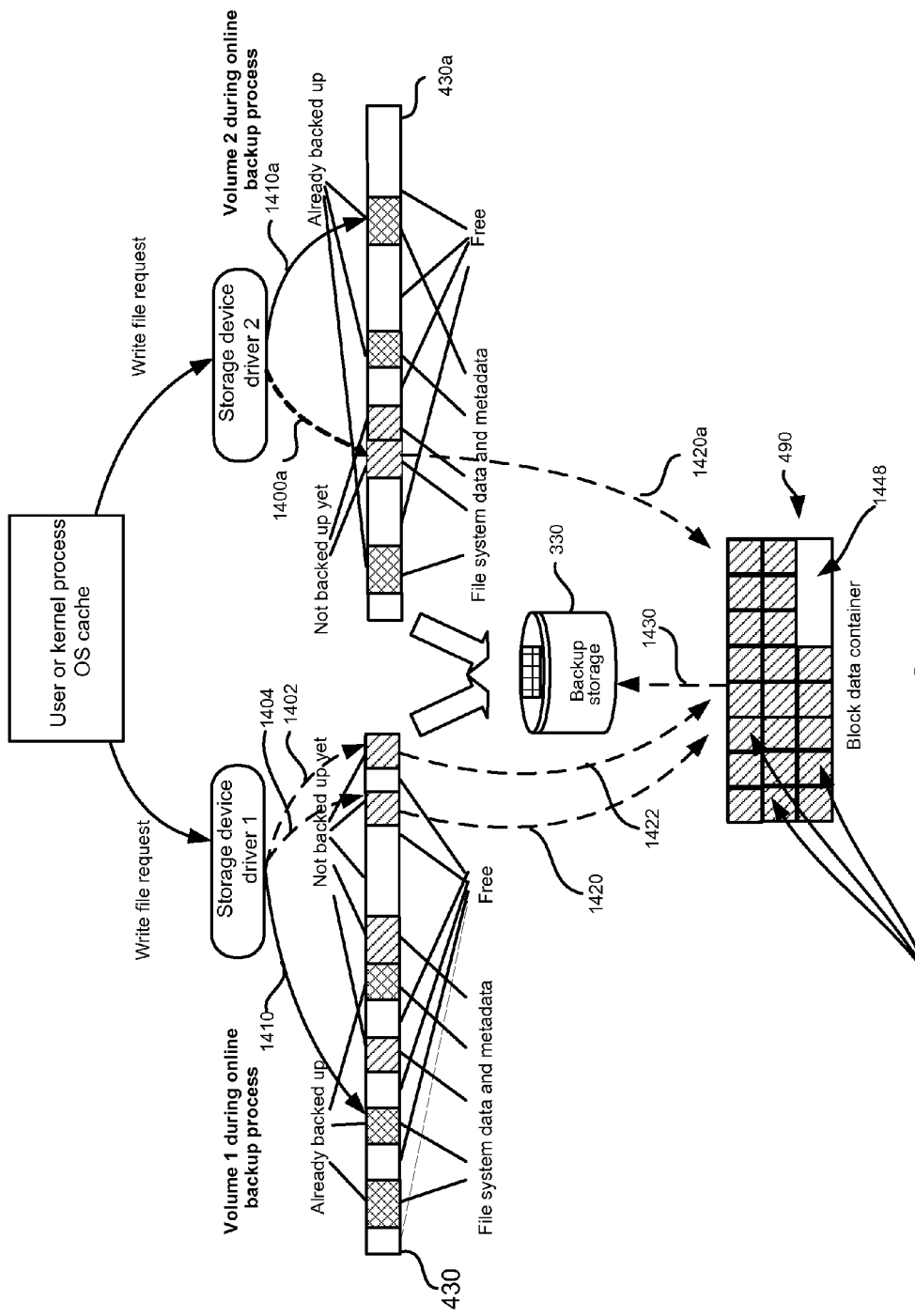
FIG. 14 illustrates an exemplary embodiment of the online backup process when the intermediate data container is close to overload.

Additionally, a prioritization can be effected, where those volumes that have a relatively high rate of access, particularly write access, are backed up first, while those volumes that show a minimum activity can be backed-up last (FIG. 13). Also, when there is an indication that the intermediate storage device is close to overload, processes whose activity results in write operations into a non-backed-up area can be slowed down (FIG. 14).

Additionally, for all volumes being backed up there can be assigned a flag, which indicates whether or not the bitmap have begun to be generated for the snapshots creating. This permit a bitmaps generation at one point in time for all the volumes being backed up. Since an application can write its data to two or more volumes (for example, several volumes can be used for equal data allocation), the snapshots of these volumes must be created at the same point in time. Otherwise the integrity of the backed-up data can be adversely affected. This can make the correct recovery of the state of the file system state, because data in the snapshot may refer to different points in time. As a result, the integrity of the data would be compromised. To avoid this, the driver used to access the volumes can use a queue of access requests. After the system has received a command for snapshot creation, all necessary items (such as an intermediate container, an identification of volumes to be backed up, a service information, and etc.) for snapshotting of all selected volumes are prepared, a snapshot creating flag is simultaneously changed for all volumes, for example, from "false" to "true" and process of snapshots creation begins. Thus, from this moment forward, all access requests to volumes in a queue of access requests can be executed, and new access requests (which are issued from a user process or file system from that point in time, when a flag is assigned to volumes) in a queue of access requests are suspended until the snapshots will be created. After the snapshot for one of volume is created, access requests in a queue of access requests for this volume can be performed in accordance with the online backup process.

Initially, a user process or file system process 400, such as, for example, a disk cache, issues a write request 410 to the volume 1 of storage device 1 and request 410a to the volume 2 of storage device 2 which are received by the storage device driver 420 and 420a. In response to write request 410, 410a, the storage device drivers 420 and 420a transmits modification requests, shown as 470, 470a, 480 and 480a, to the appropriate stored data. In this example, the modification requests 470, 470a, 480 and 480a are directed to data 440, 440a which are subject to the backup process. Accordingly, the modification process may request the data area 450, 450a which has already been copied to the backup storage 330 (i.e., requests 470, 470a) or data 460, 460a which has not yet been copied or backed-up (i.e., requests 480, 480a).

Requests 470, 470a can be performed without damaging the backed up data, because backup is a one-pass process that does not require a return to data areas that have already been processed. But, in conventional systems, request 480, 480a cannot be performed because the integrity of the backed-up data can be adversely affected. For example, a modified block that does not belong to the given copy can penetrate into the backup copy. This can make the correct recovery of the file system state impossible because data may refer to different points in time. As a result, the integrity of the data would be compromised.

To solve this problem, one exemplary embodiment of the present invention includes a temporary data storage container 490 designed to address the situations discussed above and utilizes a method of data backing up into a backup storage, described below.

The backup procedure of the present invention operates at the level of the underlying file system and may be implemented with a file system based on a block storage principle. The method of the present invention includes a procedure to define the data and metadata of the file system by the number of the block to which the subject data belongs. For internal purposes, the backup procedure efficiently defines which blocks have been copied or are subject to being copied.

As discussed above, the intermediate data storage container 490 may be any storage device suitable for storing data. For example, intermediate data storage 490 may be a temporary buffer based on the block design of the volume 330 or volume 330a. Intermediate data storage container 490 may be a memory located external to the backed up data storage space 330. Alternatively, or in addition, intermediate data storage container 490 may be placed in a dedicated part of the data storage space 330, which can represent a separate partition of the storage (shown as block data container 240 in FIG. 2b) or as a file within the file system (shown as block data container 250 in FIG. 2c) that has been reserved for the purpose of providing a temporary data storage container.

Figure 5:
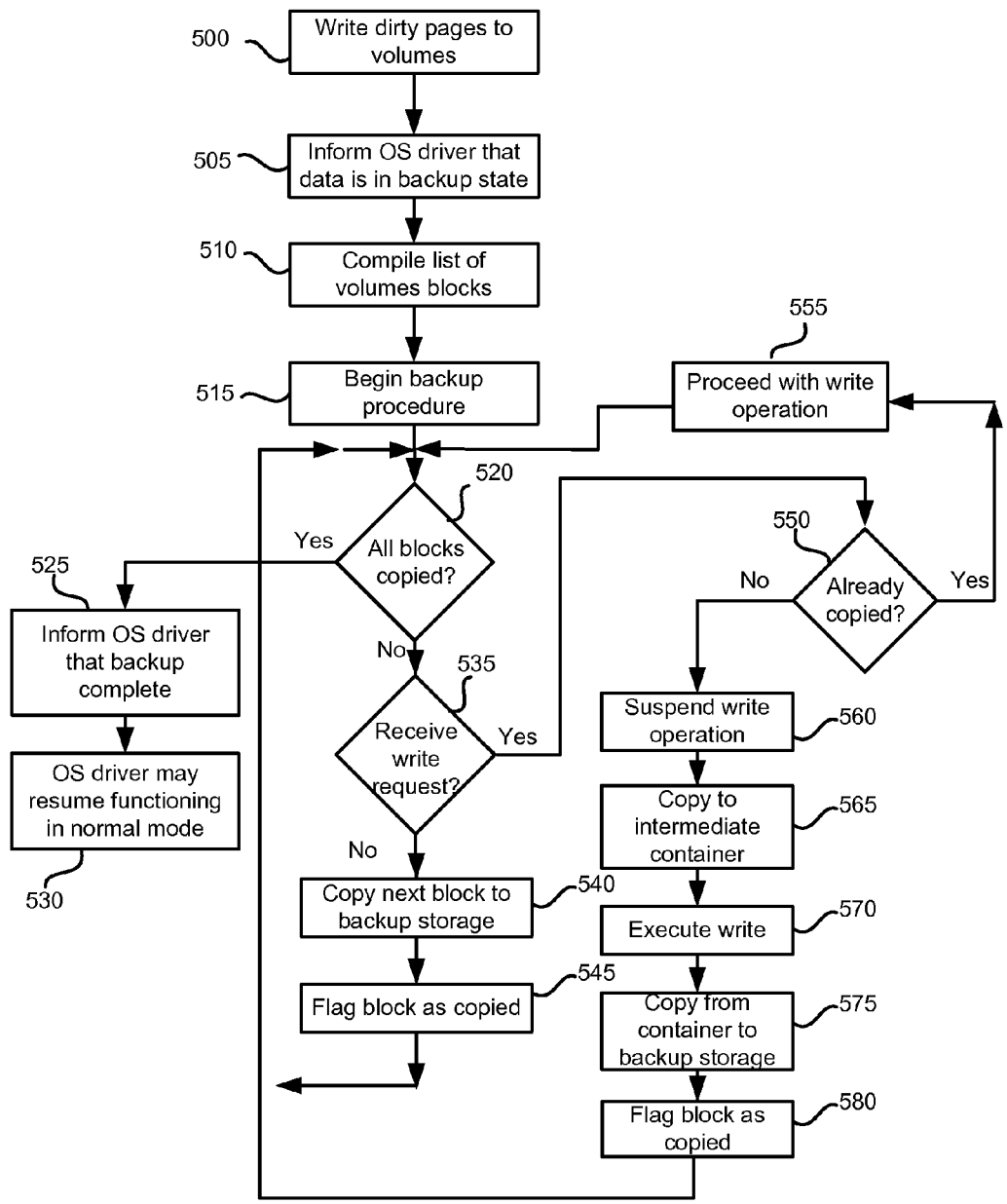
FIG. 5 is a flow chart illustrating the method of online multi-volume data backup of the present invention.

FIG. 5 shows an exemplary embodiment of the online backup procedure of the present invention. The on-line backup procedure of the present invention may begin with the step of informing the operating system driver (operating systems drivers, in case two or more operating systems are installed on storage devices/volumes) responsible for servicing the volumes that the data is in the backup state, shown at step 505.

In an alternative embodiment, the system(s) may call an operating system cache (operating systems caches) reset procedure to write "dirty" pages into the data storage(s)/volumes before informing the operating system driver(s) about the initiation of the backup process, as shown at step 500. This procedure increases the actuality of the data stored in the snapshots.

After the system(s) has informed the operating system driver(s), the system(s) then compiles the lists of data storage blocks for each storage device/volume to backup at step 510. Such lists contains the file system(s) data of different types that should be backed-up during the backup process. Once the lists has been generated, the backup procedure may begin at step 515. Until the system(s) reaches the end of all lists (see step 520) or receives a write request (see step 535), the system(s) goes down the lists and copies the blocks from data storage devices/volumes into the backup storage at step 540. On completion of each block backup, the block is flagged or marked as backed-up, as shown at step 545. During the backup process, blocks preferably remain invariable. When the last block is backed-up or the backup procedure is canceled, then at step 525, the OS(s) driver(s) servicing the data storage is informed that the backup procedure is completed and the driver(s) may continue functioning in their customary (standard) mode at step 530. Note that cancellation may be induced by the appearance of fatal errors, by the user's decision or by the processes of the operating system(s).

The OS(s) drivers servicing the data storage is preferably able to communicate with system agents running the backup procedure. Once the backup procedure is initiated, this driver (s) provides the backup procedure with the data block numbers that have been requested for write into the data storage by the operating system(s) or a user process.

The backup procedure, depending on the state of its internal data, may be responsible for determining whether or not each requested block was copied to the backup storage. If the block was not copied, then the OS driver suspends the block write and waits until the block has been copied and subsequently released.

In one exemplary embodiment, the requested block may be released by continuing the backup procedure (e.g., when the requested block is next block in the backup sequence). But, the request processing time can be very long and usually this type of mode is unacceptable for online systems.

Figure 6:
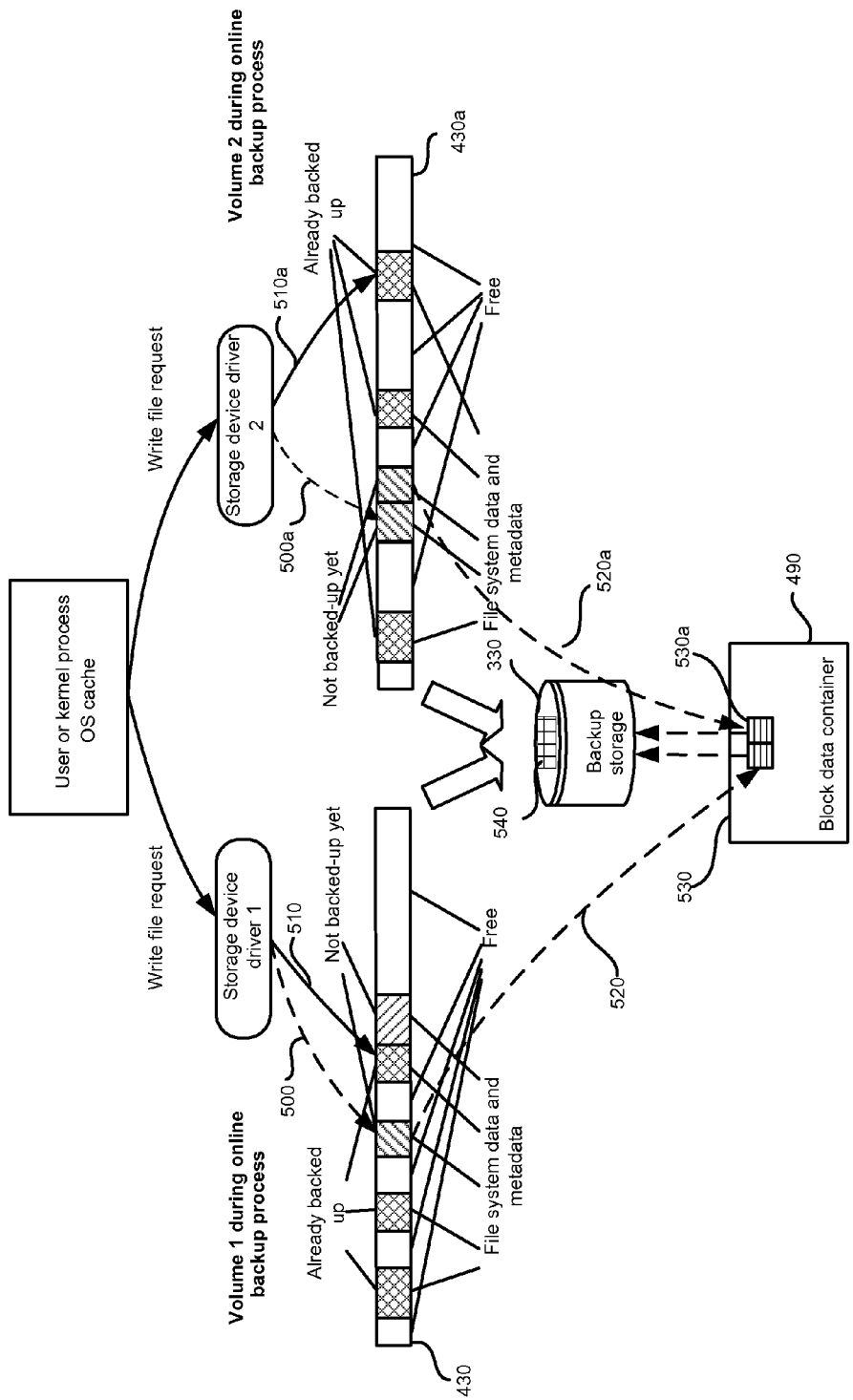
FIG. 6 shows an exemplary embodiment of the multi-volume data backup process of the present invention.

In another exemplary embodiment, the block release may be performed in connection with a specific container used as an intermediate data storage. FIG. 6 shows an exemplary embodiment of the present invention in which the system utilizes a block data container to manage the block release process. When the data storage(s) driver(s) receives a request to write a block into the area already copied by the backup procedure 510, 510a, the required write is performed without limitations (as shown at step 555 in FIG. 5). But, if the incoming write requests (shown as 500, 500a in FIG. 6) are directed to an area not yet backed-up, then the write process is suspended and the current state of the given data area is copied to the intermediate data storage container 490, as shown at 520 in FIG. 6 (and shown as steps 560 and 565 in FIG. 5). When the copy procedure is completed, the system will allow the write procedure 500, 500a to be executed (as shown at step 570 in FIG. 5).

Thus, the content of the data block, shown as 530, 530a, at the moment the backup procedure commenced is stored in intermediate block container 490. The content 530, 530a will be copied from container 490 by the backup procedure when required, as shown at 540 (and at step 575 in FIG. 5). The block will be flagged (as shown at step 580 in FIG. 5) and the backup process will continue. Note that the write procedure (shown at step 570) may be executed in parallel with the process of copying data from the intermediate block container to the backup storage device (shown at step 575). Accordingly, the system need not wait until the original write operation is complete to initiate the backup copy operation. Moreover, the step of writing the contents of the intermediate block container 490 into the backup storage device 330 may be performed in a substantially asynchronous manner (e.g., it is not necessary to wait until the intermediate block container 490 is flushed to process the next incoming block write request if the container 490 has not over-flowed). Thus, the delays that result from writing to the main storage are reduced to a minimum and the programs running on the computers connected to the data storage can continue working substantially without pause.

Figure 7:
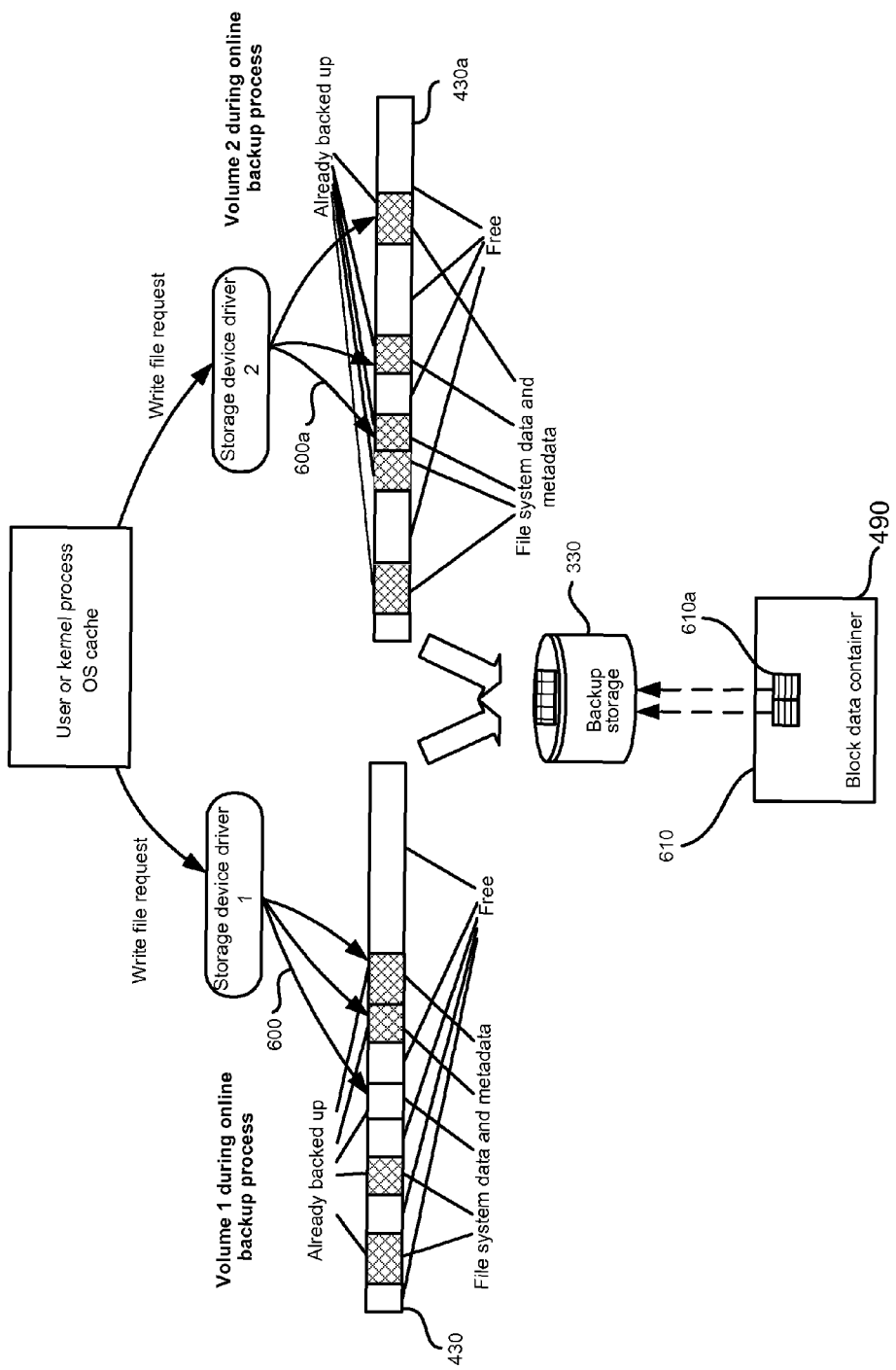
FIG. 7 shows an exemplary embodiment of the multi-volume data backup process of the present invention.

Data from the intermediate storage container can be re-written to the backup storage when the write procedure of data located in the main storage has been completed or at any other appropriate time. FIG. 7 illustrates an exemplary embodiment of the process for copying data from the block data container 490 to the backup storage device 330. In this situation, although the backup process of the main storage is completed and write requests 600, 600a directed to any regions of the volumes are performed by the driver immediately, the system must still write the data 610, 610a that is temporarily stored in the data container 490 to the backup storage 330, shown as 620, 620a. Thus, an additional write process 620, 620a and routine computer activity may both occur in the concurrent mode depending on the backup data storage.

Figure 8:
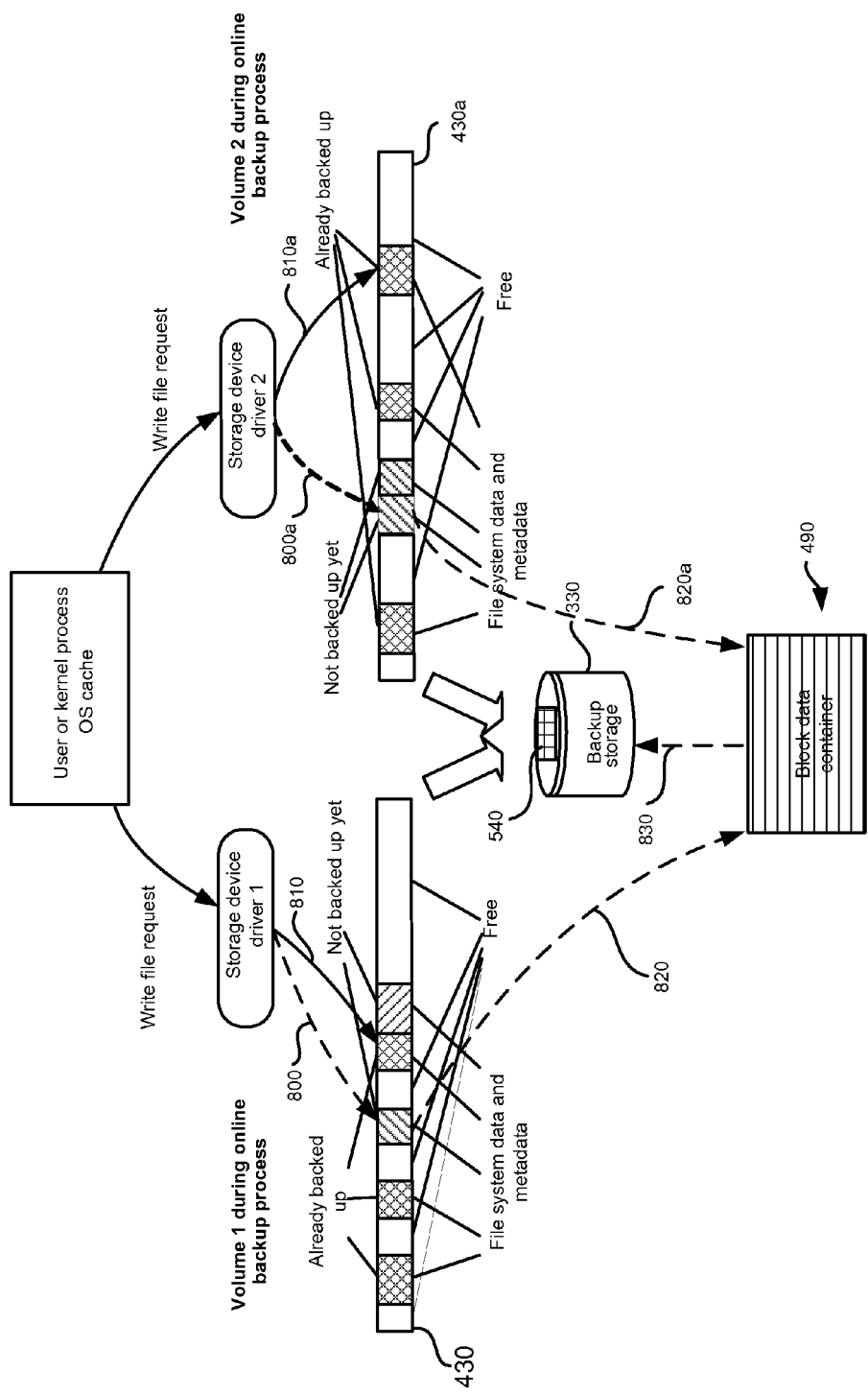
FIG. 8 shows an exemplary embodiment of the data backup process of the present invention.

FIG. 8 illustrates an exemplary embodiment of the present invention to handle an overflow of the block data container. If, during the write process to the intermediate block data container 490, the intermediate block data container 490 overflows, then the data write processes, shown as 800, 800a, to the unsaved area of the volume 1 430 and volume 2 430a should be suspended. In addition, the temporary data in intermediate block data container 490 should be written, shown as 830, to the backup storage 330 in order to free space for further storage, whereupon a write processes shown as 820 and 820a can be performed. Then, processes 800 and 800a can be resumed. However, if the pending write requests 810 are directed to the data in the main data storage 430 that have already been copied, then the execution of these write requests 810 should preferably not be suspended. Note that it is not necessary to flush the container 490 completely into the backup storage 330. Generally, it is sufficient to partially free the container 490 to allow a suspended process to be resumed as soon as possible.

Figure 9:
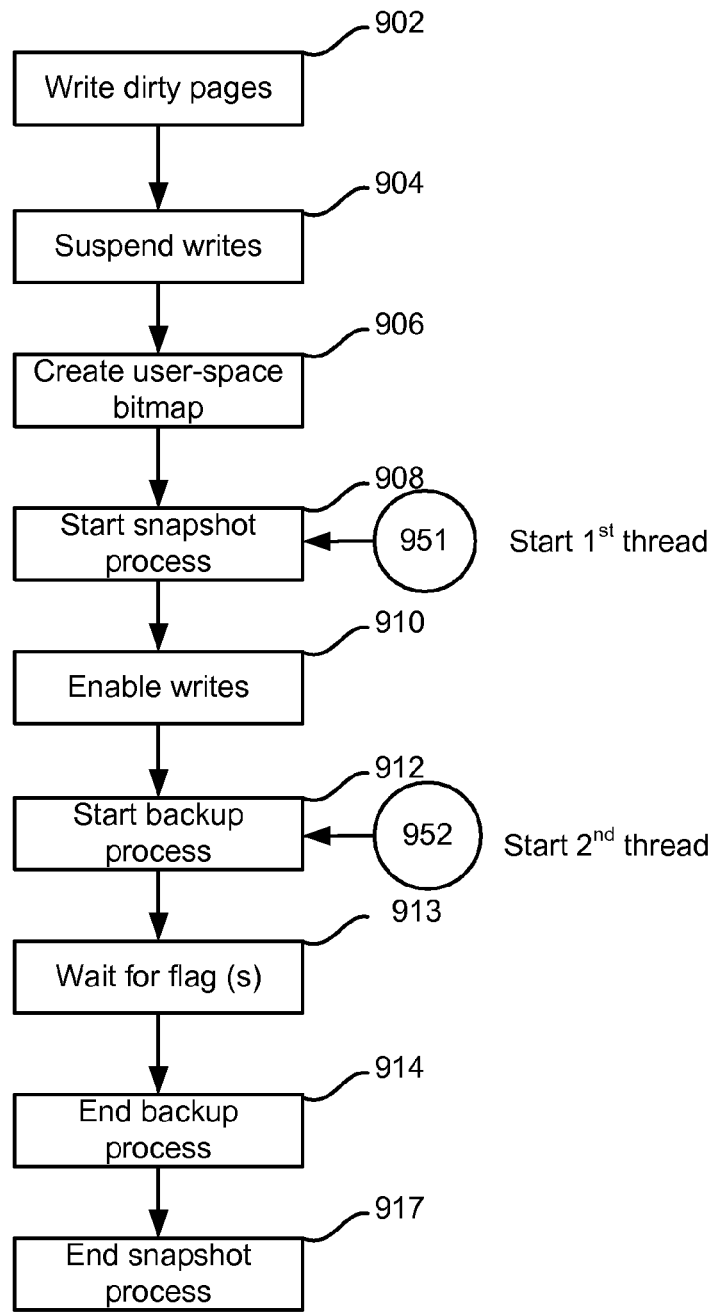
FIG. 9 illustrates an alternative embodiment of the present invention.

FIG. 9 illustrates an alternative embodiment of the present invention. As shown in FIG. 9, the first step is to write the "dirty pages" from the cache(s) to storage device (step 902). Dirty pages are pages in an OS cache that contain information to be written into a storage device, but that have not been written due to an OS policy or other OS mechanisms (for example, a "lazy write" approach used in some modern OS). The next step (step 904) suspends write operations. These suspended write operations are added to a special list, and a parameter is returned to the operating system, informing the operating system that these write operations have a "pending" status. In other words, the operating system will know that the write command execution has been postponed until later.

In step 906, a user space bitmap is created. The bitmap is such that the drivers of the operating system are not used to create it. Rather, the storage medium (for example, a disk drive, a volume of a disk drive) is read directly, the file system structure is identified, and the data blocks that are being used are identified. It should be noted that although in the exemplary embodiment the bitmap is created on a data block level, it is possible that the bitmap build procedure is related to file system reflection into block space of the storage device, and considers only non-utilized blocks (vs. free blocks). Thus, those data blocks that are being used are tagged with, for example, a 1 in the bitmap, and those that are not used are tagged as 0 in the bitmap. Note that the size of the data block can be relatively large. For example, it may be larger than a typical sector in a hard disk drive. In other words, as discussed further below, there may be a need for a further step that determines which part of the data block is actually being used, if the data block is relatively large. Note that the values used in the bitmap can be not only binary 0 and 1. As another option, for example, the bitmap can be used to store information about bad blocks. Note also that the bitmap can be created and managed in user space, or, alternatively, in OS kernel space.

Figure 10:
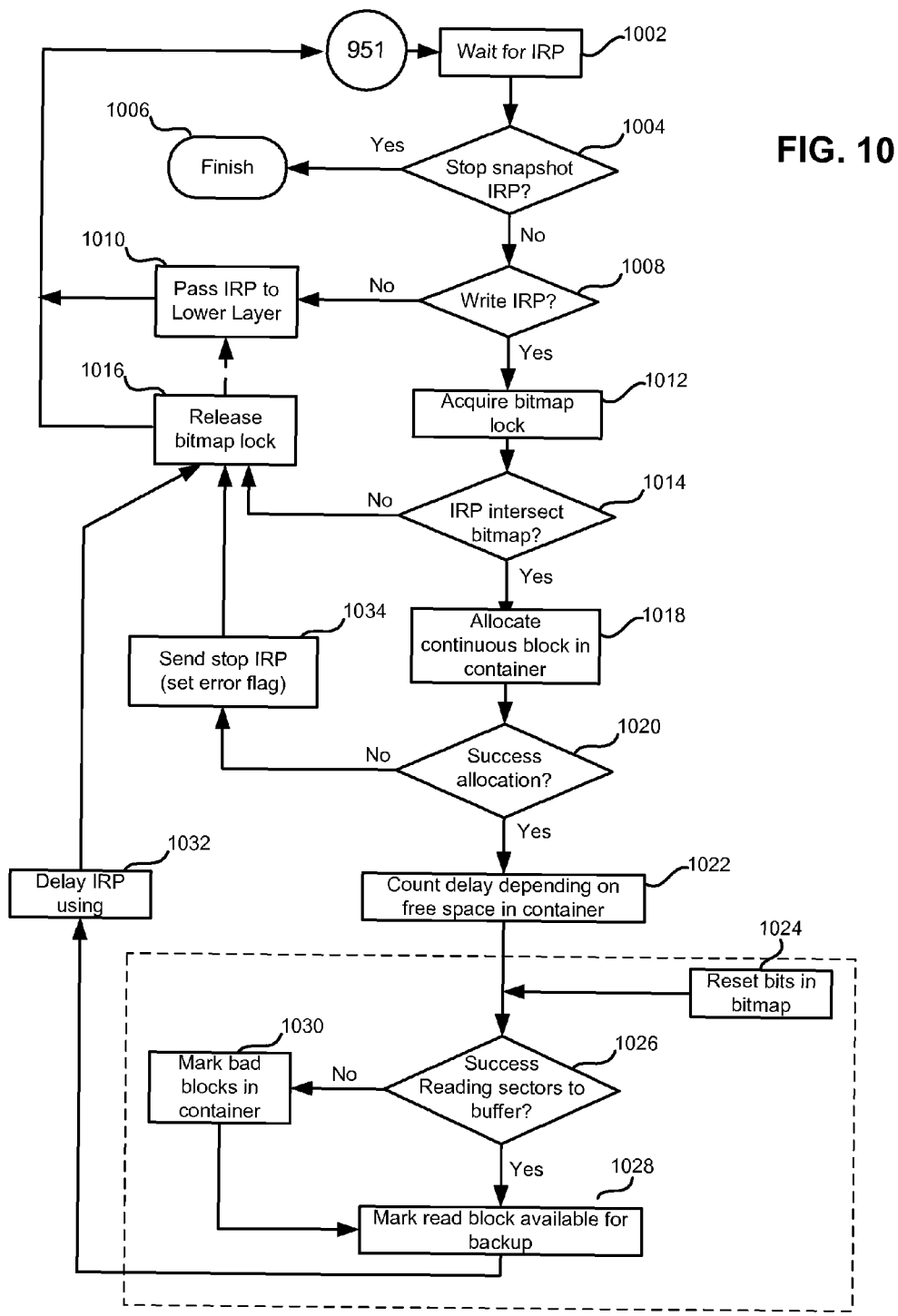
FIG. 10 illustrates the snapshot process of the embodiment of FIG. 9.

In step 908, the snapshot process begins, typically by initiating a thread, designated by 951 in FIG. 9 (see also FIG. 10). Note that the snapshot process may run asynchronously. In other words, once the snapshot process is launched, it can proceed in a separate thread, asynchronously relative to the process illustrated in FIG. 9.

In step 910, the write operations are enabled. In step 912, the backup process designated by 952 in FIG. 9 is started, see also 952 in FIG. 11. Note that the process 952 is also in asynchronous process, usually implemented as a thread. Also, note that processes 951 and 952 can be either synchronous or (preferably) asynchronous relative to each other. Synchronization can be performed using access to the bitmap as a serialization mechanism. In step 913, once a flag is received (914) that the backup process is completed, the snapshot process 951 can end (step 917).

FIG. 10 illustrates the snapshot process 951. As shown in FIG. 10, in step 1002, the snapshot process waits for the interrupt request packet (IRP). Note that the IRP sometimes goes by different names, but, in general, is a request to the OS kernel to perform some action relating to the storage device, such as a write or a read on the storage device. Once the IRP is received, the IRP is analyzed. If the IRP is a stop-snapshot type IRP (step 1004), then the process terminates (step 1006). If it is not a stop-snapshot IRP, then, in step 1008, the snapshot process 951 checks if this is a write IRP. If it is, then in step 1012, the process 951 waits for a bitmap lock. In other words, in step 1012, the bitmap is locked, and cannot be altered during the snapshot process 951. If it is not a write IRP, then in step 1010, the IRP is passed to a lower layer (e.g., to the hardware layer of the local HDD, or to the partition on it) to be performed by the OS in a normal manner.

In step 1014, the process checks if the IRP corresponds to any bits in the bitmap that have been flagged as a used block (with a "1," for example). If not, then the process proceeds to step 1016, releasing the bitmap lock. Otherwise, in step 1018, in the intermediate block container, a space is allocated, such that the space is equal to the amount of data that needs to be stored there. Successful allocation is then checked (step 1020). If the allocation has not been successful, an error flag is set (step 1034), and the process returns to step 1016. The bitmap lock released in step 1016 and operation can either continue (step 1002), or pass the IRP to the lower layer (step 1010). If the allocation in step 1020 has been successful, then a counter to be used in the delay procedure is calculated/recalculated, depending on the amount of free space in the container (step 1022). Meanwhile, the bits in the bitmap are reset (step 1024), and data from the intermediate storage container is read. If the data has been read successfully, (step 1026), the block that is available for backup is marked (step 1028), otherwise, the block is marked as a "bad" block in the container (step 1030). After step 1030, the process proceeds to step 1028.

Note that the IRP can be delayed (step 1032), for example, by using a counter. Note that the delay process 1032 can influence the counter value as well.

Figure 11:
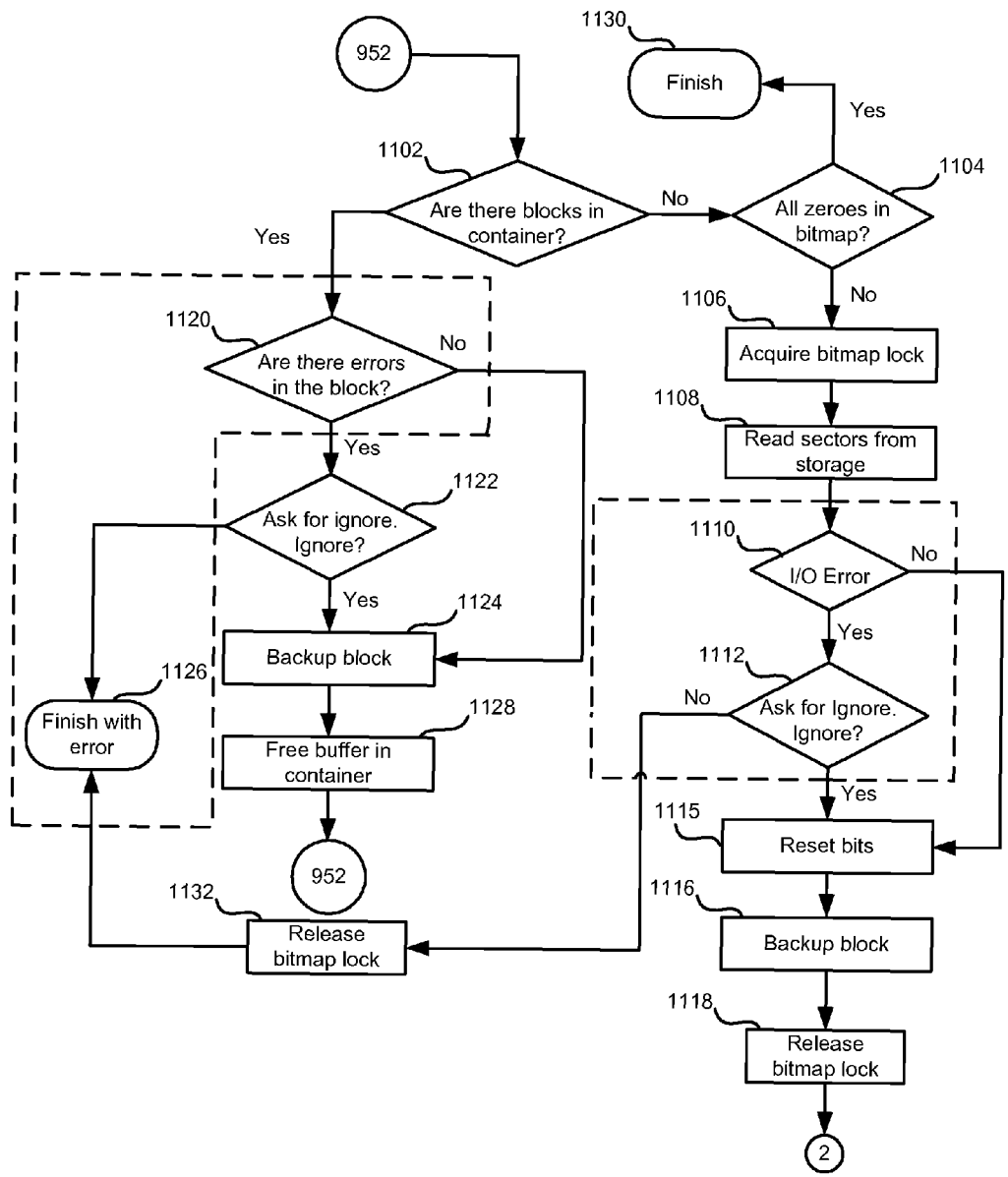
FIG. 11 illustrates the process of working with the intermediate storage container that is used for backup.

FIG. 11 illustrates the process of working with the intermediate storage container that is used for backup. In step 1102, the process checks if there are any blocks in the intermediate storage container already. If there aren't any, then in step 1104, the process checks if the bitmap contains only zeros or does not contain used blocks (note that depending upon implementation—the bitmap can contain bad block marks as well). If Yes, then the process ends in step 1130. If No, the process proceeds to step 1106, which acquires the bitmap lock. Information about a sector from the bitmap in step 1102 is used to address backup procedure to the sector. The sectors are read from storage (step 1108), such that the sector correspond to the flagged bits in a bitmap.

In step 1110, if there are no I/O errors, the process proceeds to step 1114, which resets the bits. In case of error, the system asks for user action in step 1112, for example, by creation of a dialog box on the console (e.g., by asking the user: "'Error reading disk data. Cancel operation or ignore error?'"). Alternatively, the response regarding the action to be taken can be received "in advance" by specifying some pre-defined error recovery policy. In other words, the error is not ignored, but the bitmap acquired in step 1106 is released, and the process is finished (with error).

Then in step 1115, the system resets appropriate bits in the bitmap. In step 1116, the block is backed up, and in step 1118, the bitmap lock is released. In step 1110, if there is an error, (in other words, the particular sector cannot be read), then an error is generated, and some error handling routine 1112 is involved. For example, interactive input from the user may be requested, or a pre-defined error handling approach may be used. If the received response indicates that the error cannot be ignored, the system finishes operation (step 1126).

In step 1112, if there is no "ignore," the bitmap lock is released (step 1132), and the process finishes with error (step 1126).

In step 1102, if there are copied blocks in the container, the system proceeds with backing it to the backup storage. But, in case of errors in the block (see 1120), the system asks the user (or checks a predefined policy) whether it should ignore the error (step 1122). If, in case of error, the error handling routine in 1122 returns a request to ignore the error, then the block is backed up (step 1124), and a buffer in the container is freed (step 1128). The process can then return back to step 1102. Otherwise, in step 1122, the process finishes with an error (step 1126), as described above.

Figure 12:
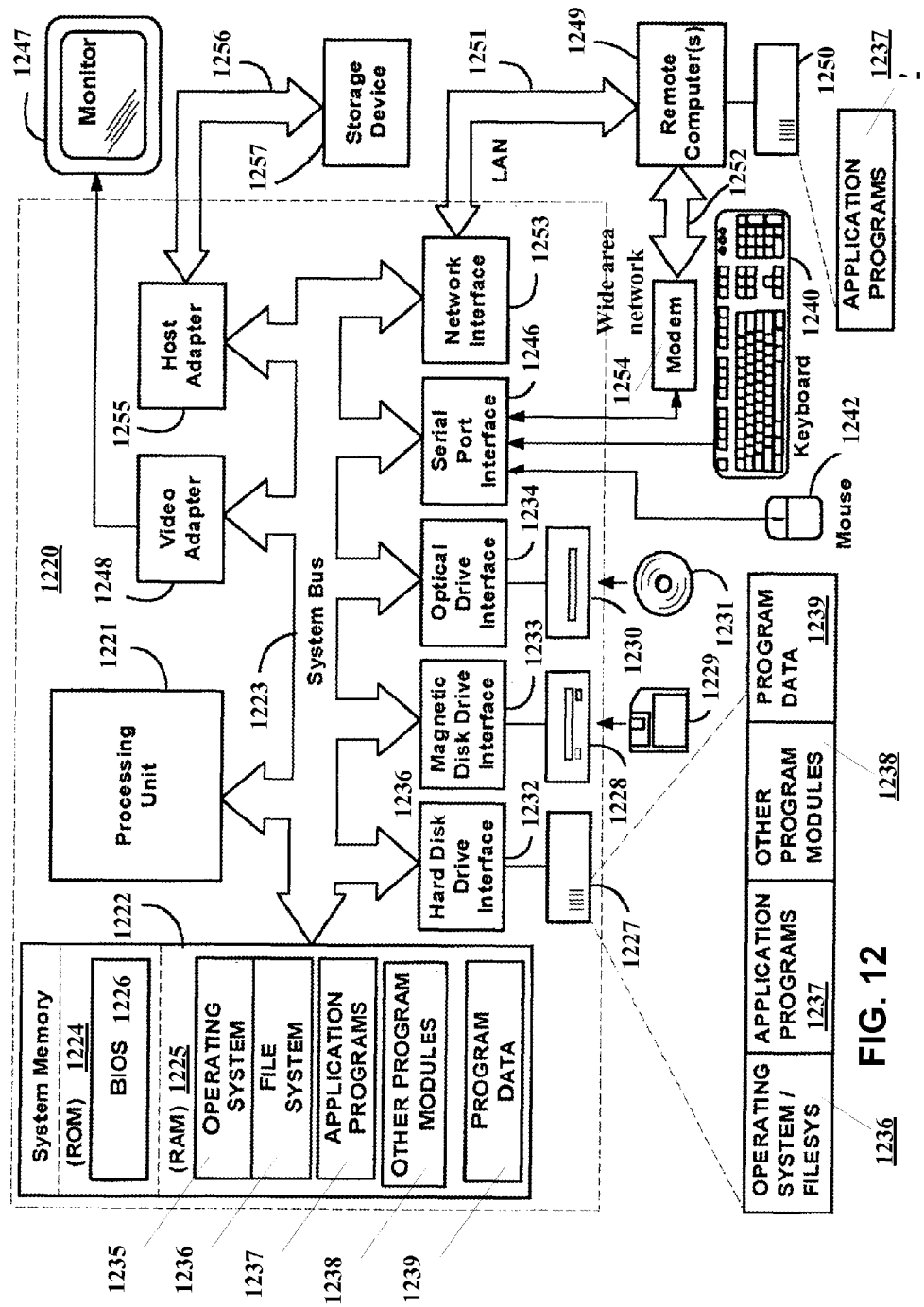
FIG. 12 illustrates an example of a computer architecture that may be used in the present invention.

With reference to FIG. 12, an exemplary system for implementing the invention includes a general purpose computing device in the form of a personal computer or server 1220 or the like, including a processing unit 1221, a system memory 1222, and a system bus 1223 that couples various system components including the system memory to the processing unit 1221. The system bus 1223 may be any of several types of bus structures including a memory bus or memory controller, a peripheral bus, and a local bus using any of a variety of bus architectures. The system memory includes read-only memory (ROM) 1224 and random access memory (RAM) 1225. A basic input/output system 1226 (BIOS), containing the basic routines that help to transfer information between elements within the personal computer 1220, such as during start-up, is stored in ROM 1224. The personal computer 1220 may further include a hard disk drive 1227 for reading from and writing to a hard disk, not shown, a magnetic disk drive 1228 for reading from or writing to a removable magnetic disk 1229, and an optical disk drive 1230 for reading from or writing to a removable optical disk 1231 such as a CD-ROM, DVD-ROM or other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide non-volatile storage of computer readable instructions, data structures, program modules and other data for the personal computer 1220. Although the exemplary environment described herein employs a hard disk, a removable magnetic disk 1229 and a removable optical disk 1231, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 1229, optical disk 1231, ROM 1224 or RAM 1225, including an operating system 1235 (preferably Windows™ 2000). The computer 1220 includes a file system 1236 associated with or included within the operating system 1235, such as the Windows NT™ File System (NTFS), one or more application programs 1237, other program modules 1238 and program data 1239. A user may enter commands and information into the personal computer 1220 through input devices such as a keyboard 1240 and pointing device 1242. Other input devices (not shown) may include a microphone, joystick, game pad, satellite dish, scanner or the like. These and other input devices are often connected to the processing unit 1221 through a serial port interface 1246 that is coupled to the system bus, but may be connected by other interfaces, such as a parallel port, game port or universal serial bus (USB). A monitor 1247 or other type of display device is also connected to the system bus 1223 via an interface, such as a video adapter 1248. In addition to the monitor 1247, personal computers typically include other peripheral output devices (not shown), such as speakers and printers. A data storage device 1257, such as a hard disk drive, a magnetic tape, or other type of storage device is also connected to the system bus 1223 via an interface, such as a host adapter 1255 via a connection interface 1256, such as Integrated Drive Electronics (IDE), Advanced Technology Attachment (ATA), Ultra ATA, Small Computer System Interface (SCSI), SATA, Serial SCSI and the like.

The personal computer 1220 may operate in a networked environment using logical connections to one or more remote computers 1249. The remote computer (or computers) 1249 may be another personal computer, a server, a router, a network PC, a peer device or other common network node, and typically includes many or all of the elements described above relative to the personal computer 1220. may further include a memory storage device 1250. The logical connections include a local area network (LAN) 1251 and a wide area network (WAN) 1252. Such networking environments are commonplace in offices, enterprise-wide computer networks, Intranets and the Internet.

When used in a LAN networking environment, the personal computer 1220 is connected to the local area network 1251 through a network interface or adapter 1253. When used in a WAN networking environment, the personal computer 1220 typically includes a modem 1254 or other means for establishing communications over the wide area network 1252, such as the Internet. The modem 1254, which may be internal or external, is connected to the system bus 1223 via the serial port interface 1246. In a networked environment, program modules depicted relative to the personal computer 1220, or portions thereof, may be stored in the remote memory storage device. It will be appreciated that the network connections shown are exemplary and other means of establishing a communications link between the computers may be used.

FIG. 13 illustrates an exemplary embodiment of the present invention for handling a backups prioritization, where those volumes that have a relatively high rate of access, particularly write access, are backed up first, while those volumes that show a minimum activity can be backed-up last. Initially, a user process or file system process 400, such as, for example, a disk cache, issues write requests to volume 1 of storage device 1 and to volume 2 of storage device 2. The access requests are received by the storage device drivers. In response to the write requests, the storage device drivers transmits modification requests, shown as 1300, 1302, 1304, 1306, 1310 to the appropriate stored data on volume 1 and modification requests 1300a, 1310a to the appropriate stored data on volume 2. Accordingly, the modification process may request the data area which has already been copied to the backup storage 330 (i.e., requests 1310, 1310a) or data which has not yet been copied or backed-up (i.e., requests 1300, 1302, 1304, 1306, 1310 and 1300a).

Requests 1310, 1310a can be executed without damaging the backed up data, because backup is a one-pass process that does not require a return to data areas that have already been processed. But, in conventional systems, requests 1300, 1302, 1304, 1306, 1310 and 1300a cannot be executed because the integrity of the backed-up data can be adversely affected. If the incoming write requests are directed to an area that is not yet backed-up, then the write process is suspended and the current state of the given data area is copied to the intermediate data storage container 490 (and shown as steps 560 and 565 in FIG. 5). When the copy procedure is completed, the system will allow the write procedure 1300, 1302, 1304, 1306, 1310 and 1300a to be executed (as shown at step 570 in FIG. 5).

Thus, the contents of the data block, shown as 1342, 1344, 1346, 1348 and 1352 at the moment the backup procedure commences, is stored in intermediate block container 490. The content 1342, 1344, 1346, 1348 and 1352 will be copied from container 490 by the backup procedure when required, as shown at 1330 (and at step 575 in FIG. 5). The block will be flagged (as shown at step 580 in FIG. 5) and the backup process will continue. Note that the write procedure (shown at step 570) may be executed in parallel with the process of copying data from the intermediate block container to the backup storage device (shown at step 575). Accordingly, the system need not wait until the original write operation is complete to initiate the backup copy operation. Moreover, the step of writing the contents of the intermediate block container 490 into the backup storage device 330 may be performed in a substantially asynchronous manner (e.g., it is not necessary to wait until the intermediate block container 490 is flushed to process the next incoming block write request if the container 490 has not over-flowed). Thus, data from the volume 1 will be backed up first and volume 2 will be backed-up last, if volume 1 will have a relatively high rate of access (particularly write access) than volume 2.

FIG. 14 illustrates an exemplary embodiment of the online backup process when the intermediate storage device is close to overload. If, during the write process to the intermediate block data container 490, the intermediate block data container 490 is close to overload, then the flag is assigned to each volume that the intermediate storage device is close to overload, and the data write processes, shown as 1402, 1404 and 1400a to the unsaved area of volume 1 430 and volume 2 430a should be suspended. In addition, the temporary data 1344 in intermediate block data container 490 should be written, shown as 830, to the backup storage 330 in order to free space 1448 for further storage, whereupon a write processes shown as 1420, 1422 and 1420a can be performed. Then, processes 1402, 1404 and 1400a can be resumed. However, if the pending write requests 1410 and 1410a are directed to the data in the main data storages 430 and 430a which have already been copied, then execution of these write requests 1410 and 1410a should preferably not be suspended. Note that it is not necessary to flush the container 490 completely into the backup storage 330. Generally, it is sufficient to partially free the container 490 to allow a suspended process to be resumed as soon as possible.

This invention provides numerous advantages over conventional backup procedures. The present invention differs from file systems such as Episode and WAFL in that the system and method of the present invention, in one embodiment, operates at the level of data storage blocks and not at the level of inodes or files. As a result, the present invention is able to provide a faster and more efficient backup process. Moreover, a container is utilized as a means of intermediate data storage for the data that is subject to backup until this data is stored in the backup storage. As a result, the present invention is able to provide an efficient online backup process.

Having thus described a preferred embodiment of the computer network system of the present invention, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A computer system that provides block-based backup of data, comprising:
    a plurality of data storages storing block data, wherein the block data corresponds to a data set distributed across multiple data storages, the distributed data set comprising interconnected data residing on different data storages, which is maintained in synchronization, wherein the block data distributed over multiple data storages that have not been backed up is protected prior to writes to these blocks;
    a backup storage that stores block data without suspending an application program accessing the data;
    an intermediate data block container that stores block data, wherein the computer system copies a data block from any of the data storages into the intermediate data block container and copies a data block from the intermediate data block container into the backup storage during an online data backup process;
    wherein:
        snapshots reflecting a current state of all data storages to be backed up are simultaneously created;
        a bitmap of data storage blocks located in the data storages that are subject to the data backup is generated, based on the snapshots;
        a data storage block is copied to the backup storage based on the bitmap of data storage blocks; and
    a write command that is directed to a data storage block that is subject to the data backup process but has not yet been copied is suspended, old data in the data storage block of the data storages that is the subject of a write command is copied to the intermediate storage container, then the write command writing new data to the data storage block of the data storages is executed and the data storage block containing the old data from the intermediate block data container is subsequently copied to the backup storage; and
    wherein if the data block that is subject to the backup is unavailable, that data block is marked as invalid and operations are continued with other data blocks in the data storage.

2. The computer system of claim 1, wherein a data storage is a logical partition or volume.

3. The computer system of claim 2, wherein a data storage is a non-volatile storage device.

4. The computer system of claim 1, wherein (a) copying the data storage block that is the subject of a write command to the intermediate storage container, (b) executing the write command and (c) subsequently copying the data storage block from the intermediate block data container to the backup storage are performed simultaneously.

5. The computer system of claim 1, wherein (a) copying the data storage block that is the subject of a write command to the intermediate storage container, (b) executing the write command and (c) copying the data storage block from the intermediate block data container to the backup storage are performed in any order.

6. The computer system of claim 1, wherein the multiple data storages are prioritized for backup based on write activity to the data storages.

7. The computer system of claim 1, wherein the bitmap is created for each data storage.

8. The computer system of claim 1, wherein processes, whose activity results in write operations into a non-backed-up area, are slowed down in response to an indication that the intermediate data container is close to overload.

9. The computer system of claim 1, wherein the intermediate block data container is any of: memory that is external to the computer system, a storage device, a separate partition, and a file within a file system on the storage device.

10. The computer system of claim 1, wherein the intermediate block data container is created for each data storage to be backed up.

11. The computer system of claim 1, wherein a single snapshot for all data storages to be backed up is created.

12. The computer system of claim 1, wherein at least one file system driver translates write requests addressed to files located in the data storages and received from a user process into one or more block write operations.

13. The computer system of claim 1, wherein a flag, which indicates whether the bitmaps are in the process of being generated for the snapshots of all data storages to be backed up, is assigned.

14. A method of backing up a computer system, wherein the computer system includes several data storages storing a distributed data set block data, comprising interconnected data residing on different data storages, wherein the block data distributed over multiple data storages that have not been backed up is protected prior to writes to these blocks, a backup storage storing block data, and an intermediate data block container storing block data, wherein the computer system copies a data block from the data storages into the intermediate data block container and copy a data block from the intermediate data block container into the backup storage during an online data backup process, the method comprising:
    simultaneously creating snapshots reflecting a current state of all data storages to be backed up;
    creating a bitmap of data storage blocks located in the data storages that are subject to the data backup process;
    copying a data storage block to the backup storage pursuant to the bitmap of data storage blocks; and
    suspending a write command directed to a data storage block that is subject to the data backup process but has not yet been copied;
    copying old data in the data storage block of the data storages that is the subject of a write command to the intermediate storage container, then executing the write command writing new data to the data storage block of the data storages; and subsequently copying the data storage block containing the old data from the intermediate block data container to the backup storage, wherein, if the data block that is subject to the backup is unavailable, that data block is marked as invalid and operations are continued with other data blocks in the data storage.

15. The method of claim 14, wherein at least one file system driver translates write requests addressed to files located in the data storages and received from a user process into one or more block write operations.

16. A non-transitory computer useable recording medium having computer executable program logic stored thereon for executing on a processor, the computer program logic comprising computer program code for implementing the steps of claim 14.

\* \* \* \* \*